United States Patent [19]
Ando

[11] Patent Number: 4,835,762
[45] Date of Patent: May 30, 1989

[54] OPTICAL MEMORY DEVICE AND SYSTEM

[75] Inventor: Hideo Ando, Hino, Japan

[73] Assignee: Tokyo Shibaura Denki Kabushiki Kaisha, Japan

[21] Appl. No.: 847,110

[22] Filed: Jul. 10, 1986

Related U.S. Application Data

[63] Continuation of Ser. No. 731,766, May 8, 1985, abandoned, which is a continuation of Ser. No. 559,010, Dec. 8, 1983, abandoned, which is a continuation of Ser. No. 305,330, Sep. 24, 1981, abandoned.

[30] Foreign Application Priority Data

Oct. 28, 1980 [JP] Japan ................. 55-151269

[51] Int. Cl.⁴ .......... G11B 7/24; G11B 23/00; G11B 25/04
[52] U.S. Cl. ................. 369/272; 360/27; 369/47; 369/93; 369/95
[58] Field of Search ......... 369/30, 32, 44, 47, 369/48, 93, 95, 111, 275, 284, 277, 278, 279, 282, 272; 358/342; 365/234, 215; 360/27, 37.1

[56] References Cited

U.S. PATENT DOCUMENTS

| | | | |
|---|---|---|---|
| 3,198,880 | 8/1965 | Loulon | 358/342 |
| 3,366,733 | 1/1968 | Frohlock | 358/342 |
| 3,610,722 | 10/1971 | Bestenreiner | 350/3.5 |
| 3,701,846 | 10/1972 | Zenzefilis | 360/33.1 |
| 3,819,281 | 6/1974 | Hogue | 360/51 |
| 3,855,426 | 12/1974 | Bouwhuis | 369/275 |
| 3,894,179 | 7/1975 | Jacobs | 369/275 |
| 3,931,459 | 1/1976 | Korpel | 369/109 |
| 3,962,688 | 6/1976 | Westerberg | 369/111 |
| 4,272,574 | 6/1981 | Lippits | 346/76 L |
| 4,278,758 | 7/1981 | Drexler | 430/616 |
| 4,418,365 | 11/1983 | Camras | 358/342 |

FOREIGN PATENT DOCUMENTS

| | | | |
|---|---|---|---|
| 2102876 | 12/1972 | Fed. Rep. of Germany | 369/277 |
| 2721334 | 12/1977 | Fed. Rep. of Germany | 369/111 |
| 2461324 | 1/1981 | France | 430/616 |
| 55-17789 | 4/1980 | Japan | 369/111 |
| 55-103854 | 4/1980 | Japan . | |

Primary Examiner—Steven L. Stephan
Attorney, Agent, or Firm—Banner, Birch, McKie & Beckett

[57] ABSTRACT

In the optical memory device of this invention, an annular information recording area is formed on one surface of a disc-shaped subplate which is rotatable about a center hole. Information is recorded on, or read from, the circular or spiral track of the information recording area, the track being centered on the center hole. On the same surface of the subplate is formed a position signal area of the same material as that of the information recording area, but at a different position from the information recording area. As the device is rotated, the time when the position signal area passes a given point may be detected and used as a reference, so that the location within the track of recording or reproducing information can be determined.

15 Claims, 2 Drawing Sheets

OPTICAL MEMORY DEVICE AND SYSTEM

This application is a continuation of application Ser. No. 731,766, filed May 8, 1985, now abandoned, which is a continuation of Ser. No. 559,010, filed Dec. 8, 1983, now abandoned, which is a continuation of Ser. No. 305,330, filed Sept. 24, 1981, now abandoned.

BACKGROUND OF THE INVENTION

This invention relates to the recording of information, on rotating discs, in a form which can be written and read optically through the projection of a focused laser beam. The information is typically recorded in tracks on the surface of the disc. With the disc rotating, in order to determine the precise starting point (heading) in the desired track at which writing or reading should begin, it is necessary to provide a datum point or position signal common to all tracks.

A conventional method of providing this datum point is shown in FIG. 1, which is a schematic perspective view showing an optical disc 1 being driven by a disc drive. The rotating disc 2 of the disc drive receives its rotational energy from the motor 5 through the center shaft 3. Under the rotating disc 2, the timing disc 4 is coaxially supported with the rotating disc 2 on the center shaft. On the surface of the timing disc 4 is a timing mark used as the datum. A light source 6 projects light onto the surface of the timing disc 4; and a detector 7 detects the amount of this light which is reflected from the surface. In order properly to position the optical disc 1 with respect to the timing disc 4 and to prevent relative rotational movement between the two (since movement would cause reading or recording errors), a projection 2' is provided on the edge of rotating disc 2, and a recess 1' is provided in the edge of the optical disc 1. Before rotation begins, when the optical disc 1 is first placed on the rotating disc 2, it is done so as to couple the projection 2' with the recess 1'. Determination of the location of information stored on the optical disc 1 is made possible by projecting the light on the surface of the timing disc 4 and detecting (through the detector 7) the variations in the amount of light reflected by the mark.

In the case of this kind of disc drive, however, as it is necessary to have a timing disc 4 in addition to the rotating disc 2, the disc drive is that much more complicated. Furthermore, when installing an optical disc 1 on the rotating disc 2, the operator must be careful to match the recess 1' with the projection 2'. Also, production of optical discs is made more complicated by the need to provide recesses 1' in the edges.

SUMMARY OF THE INVENTION

This invention is based on the circumstances mentioned above, and one of its objects is to provide, on an optical memory device on which information may be read and written optically through a focused laser beam, an easily-detected datum point for determining the location of stored information. Another object of the invention is to enable disc drives to be simplified by omitting the timing disc.

In order to attain the above objects, in the optical memory device and system which comprise this invention, an annular recording area is formed on one side of a disc-shaped subplate rotatable about a center hole. It is in this recording area where the information wil be recorded on the circular or spiral recording track centered on the above-mentioned center hole. A position signal area is also formed on the same side of the subplate, but in a different location from the information recording area. When the optical memory device is rotated, passage of the position signal area is detected as the datum from which the writing or reading location, in the recording area, is determined. Placing the datum point directly on the optical memory device as this invention shows makes possible the simplification of the disc drive by eliminating the need for a timing disc. After mounting the optical memory device on the rotating disc, it is only necessary to direct a light at the position signal area of the optical memory device and to detect the reflected or transmitted light, in order to establish the datum.

If the position signal area and the information recording area are formed of the same material, both can easily be formed at the same time by mounting a single mask on the substrate and evaporating the light-reflecting material over it. And if the information recording area and the position signal area are made of the same material in this way, there is no possibility of being unable correctly to reproduce the recorded information due to the discoloration or deterioration of just the position signal area. By using stable, long-lasting material for the information recording area, it becomes possible to maintain the position signal area made of the same material in the same condition for a long time. Finally, a position signal area formed in this way is not easily peeled from the subplate; thus it is always possible to pick up stabilized datum point from the position signal area. Other objects and features of this invention will be apparent from the following description read in connection with the accompanying drawings.

DETAILED DESCRIPTION OF THE PREFERRED EMBODIMENT

Figure 1:
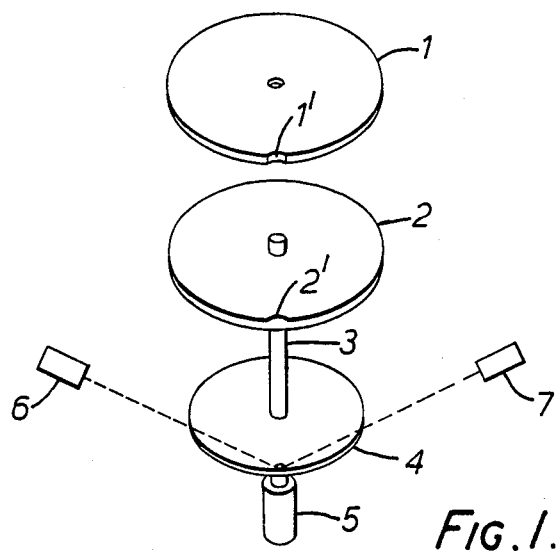
FIG. 1 is the brief perspective view showing the conventional disc drive.
Figure 2A:
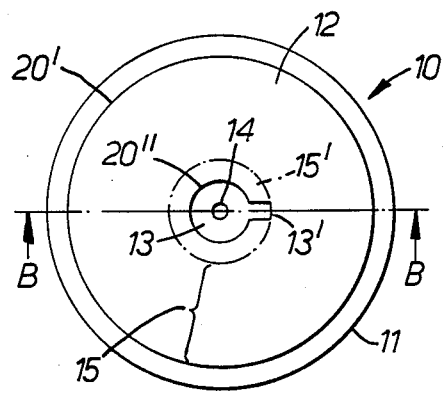
FIG. 2(A) is the schematic plan view showing an optical memory device which is an example of the embodiment of this invention.
Figure 2B:
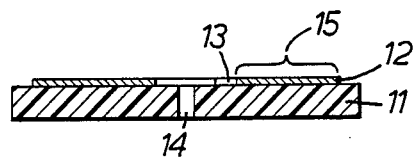
FIG. 2(B) is the sectional view taken along line B—B shown in FIG. 2(A).
Figure 2C:
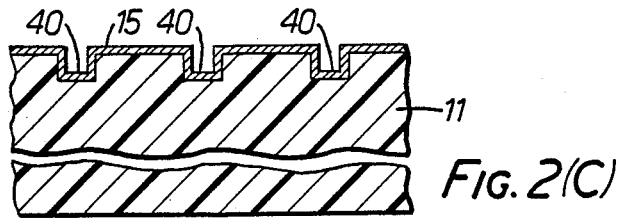
FIG. 2(C) is the enlarged sectional view showing the optical memory device of FIG. 2(B).

The optical memory device 10 in FIG. 2 is formed as follows. A disc-shaped subplate with a diameter of about 30 cm and a thickness of 0.2 mm to 2 mm is molded of transparent synthetic resin composed of acrylic resin and the like. In it the center hole 14 is bored. On the upper surface of this subplate, the spiral track 40 is made to form about 20,000 grooves by a 2 to 3 um pitch toward the outer edge of the subplate 11 as shown in FIG. 2(C), the width of the groove being 0.6 to 0.7 um and the depth being 50 to 100 nm. On the surface of the subplate 11, through the evaporation (for example by spatter evaporation) of light-reflecting material such as Al or Te, the annular light-reflecting area 12 is formed with a thickness in the region of 20 to 60 nm and substantially even throughout. The outer edge of this annular area is a circle about 290 mm in diameter with its center on the central hole 14 of the subplate 11; and the inner edge is a circle about 120 mm in diameter with its center on the central hole 14 of the subplate 11. From part of this inner edge the non-reflecting area 13 projects outward 5 mm. In the light-reflecting layer 12, the information recording area 15 is everything between the outer edge and the dashed circle of FIG. 2(A) its center at the center hole 14 and passing through the end of the projection 13 (a circle of about 130 mm diameter). In the information recording area 15 the information is recorded by the laser beam forming pits in the grooves of a track 40 shown in FIG. 2(C). The ring-shaped part within which is located the projection 13 is the position-signal area 15' producing the timing signal for recording and reading the information in the information recording area 15. For the subplate 11, any material is permitted if it is transparent synthetic resin. For example, polyacrylic acid, polymethacrylic acid and their lower grade alkylester and the like are considered usable.

Figure 3:
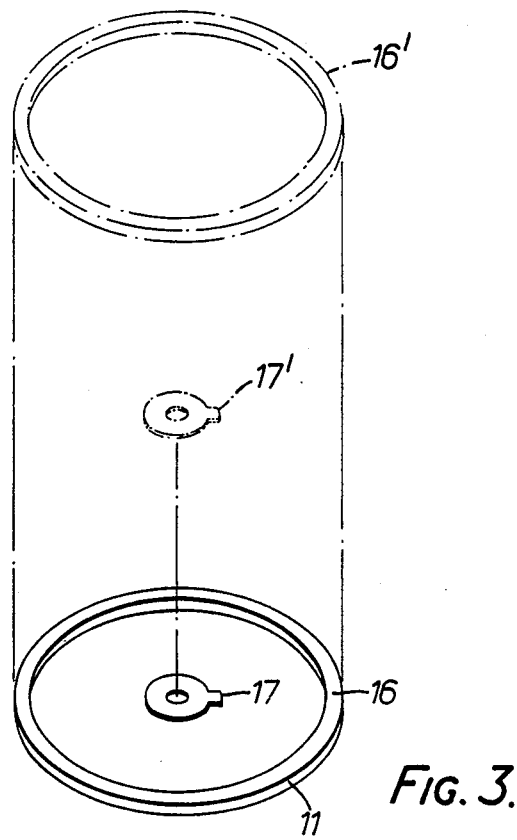
FIG. 3 is the perspective view showing the subplate mounted with a mask for the purpose of forming the light-reflecting layer on the subplate when the optical memory device shown in FIG. 2(A) is to be made.

An example of a method of forming a light-reflecting layer 12, is shown in FIG. 3. Two masks are attached to the subplate. The first mask 16' is a ring with its outside diameter equal to that of the subplate and its inside diameter equal to the desired outside diameter of the light-reflecting area. The second mask 17' is a ring with its inside diameter equal to that of the center hole 14 and its outside diameter equal to the desired inside diameter of the light-reflecting area and having a part of the outside circle projected to be the same shape as the said projection 13. After these two masks 16' and 17' are attached, light-reflective material is evaporated on the surface of the part of the subplate 11 which is not masked, to form the light-reflecting layer 12. As the method of evaporation, vacuum evaporation or ion evaporation, as well as spatter evaporation, can be adopted.

Figure 4:
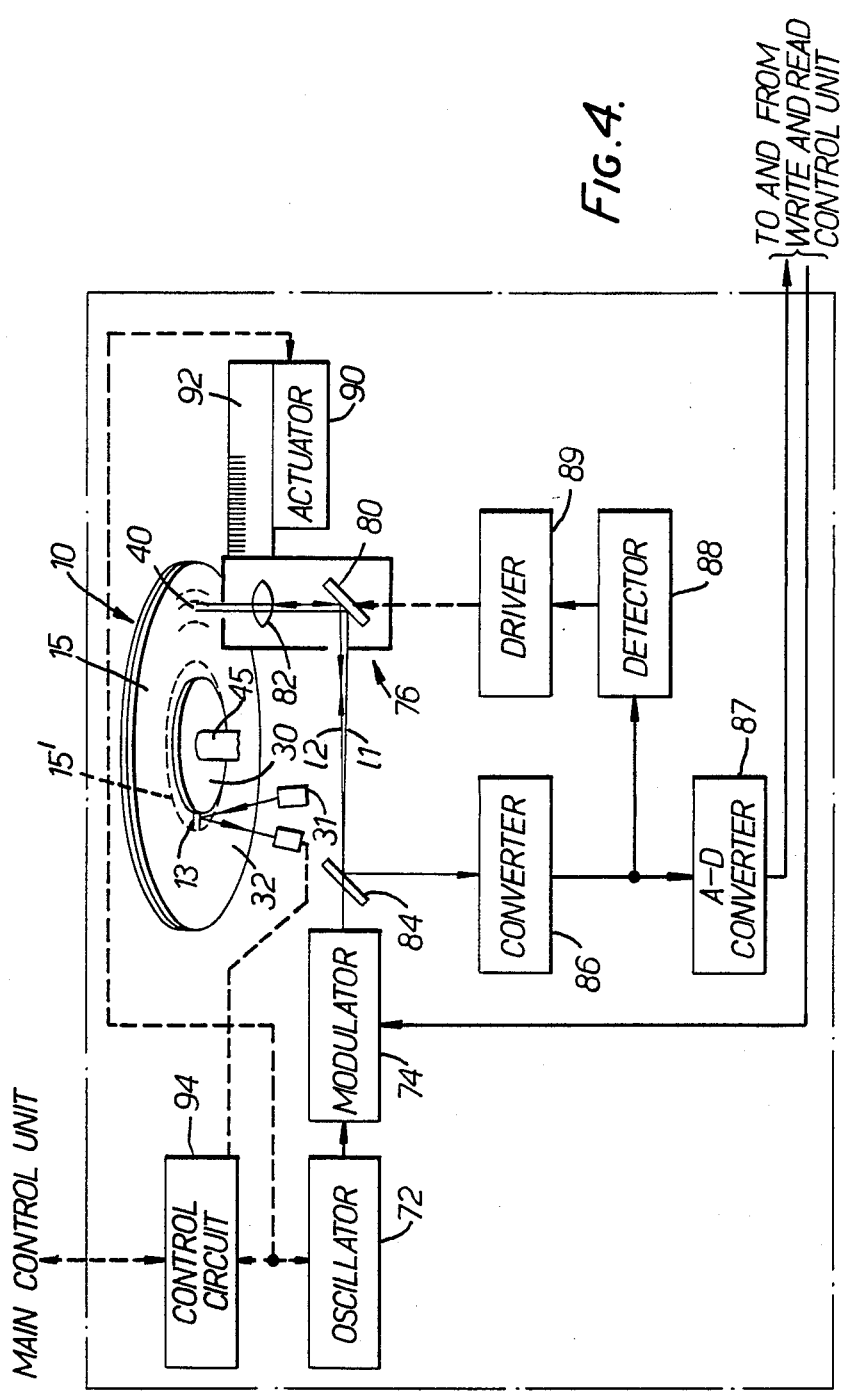
FIG. 4 is the schematic view showing the optical memory system which reads and writes the information using the optical memory device shown in FIG. 2(A).

FIG. 4 schematically shows the optical memory system which reads and writes information using the optical memory device 10. In FIG. 4, a laser oscillator 72 produces a laser beam, which is modulated by a modulator 74. The modulator 74 is connected to the write and read control unit and on-off modulates the incident laser beam according to signal output (i.e., picture information and index information) from the write and read control unit. An optical head 76 receives the on-off modulated laser beam and projects it onto the optical memory device 10 rotating at a constant speed. The optical head 76 includes a galvanometer 80 which is a mirror rockable along a radius of the optical memory device 10 and a lens system 82 for focusing the laser beam from the galvanometer 80 on the optical memory device 10.

The optical memory device 10 is formed, for instance, by depositing a Te layer on the upper surface of a plastic subplate, forming an information recording area 15 and a position signal area 15' having a projected part. Within the track 40, the Te layer is vaporized according to the modulating content of the incident light beam $L_1$, whereby a corresponding train of pits is formed. In this way, picture information is recorded in the form of a spiral track 40 along said groove on the optical memory device 10. When reading out the record of picture information imprinted on the optical memory device 10 in the above manner, the optical memory device 10 is rotated at a constant speed, and a laser beam $L_2$ produced in the laser oscillator 72 is focused by the optical head 76 onto the record track, and the scanning for reading is effected. The recorded picture information is reproduced as light reflected by the optical memory device. The reflected light is transmitted through the optical head 76 and reflected by a reflector 84 onto a photo-electric converter 86, which converts the incident light to an electrical signal. An analog-to-digital (A-D) converter 87 is connected to the photoelectric converter 86, and converts the analog signal output of the photoelectric converter 86 into a digital signal suited for coupling to the write and read control unit. A detector 88 is also connected to the photoelectric converter 86 and produces a control signal corresponding to the deviation of the laser beam $L_2$ from the center of the bit train of the record track. A galvanometer driver 89 is connected to the detector 88 and drives the galvanometer 80 according to the control signal from the detector 88. A linear actuator 90 changes the radial position of the optical head 76 relative to the optical memory device 10 according to a control signal from the control circuit 94. The linear actuator 90 is provided with an optical scale 92 for detecting the radial position of the optical head 76. The optical scale 92 supplies a position signal to the control circuit 94 every time the optical head 76 is shifted in position. The control circuit 94 supplies control signal to the main control unit, laser oscillator 72, leanear actuator 90 and a drive unit (not shown) for driving the optical memory device 10. The disc-shaped turntable 30 is rotated by the driving member (not shown) through the drive shaft 45 beneath the turntable 30. On the upper surface of this turntable 30, the optical memory device 10 is loaded coaxially. The optical head 76, positioned outward of the turntable and below the lower surface of the optical memory device 10, picks up the picture information and index information recorded on the optical memory device 10 or records the picture information and the like on the optical memory device.

Light emitted from the light source 31, an LED adjacent to the drive shaft 45, is reflected by the position signal area 15' of the device 10; reflected light is received by the light detector 32. When reflected light is not received by the detector 32, that is, when light from the light source 31 illuminates the projection 13 of the position signal area 15', the light detector 32 produces a position signal as the datum time of rotation of the optical memory device 10 and sends it to the main control unit. The control circuit 94 sends a read or write start signal to the optical head 76 when the correct amount of time has elapsed (as determined by the main control unit) after the position signal. As a result, the optical head 76 starts to operate, reading or writing information, when it is adjacent to the desired position in the requested track.

Next, referring to the drawings, explanation will be given regarding another embodiment.

Figure 5A:
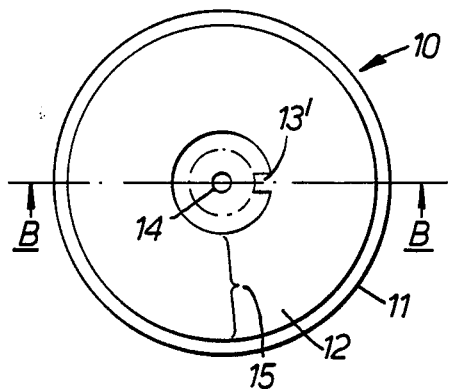
FIG. 5(A) is the schematic plan view showing an optical memory device which is another example of the embodiment of this invention.
Figure 5B:
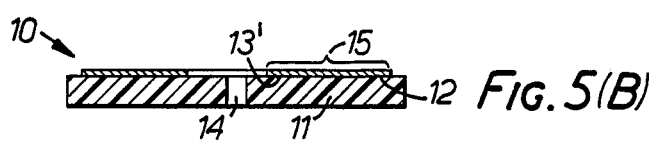
FIG. 5(B) is the sectional view taken along line B—B shown in FIG. 5(A).

FIG. 5(A) is a schematic plan view of another embodiment of this invention. FIG. 5(B) is a sectional view taken along line B—B of FIG. 5(A).

In the optical memory device 10 shown in FIG. 5, the light-reflecting layer is formed so that a part of the layer 12 projects toward the center hole 14 of the subplate 11 and beyond the information recording area. Therefore, the optical memory device 10 in FIG. 5 has the same construction as that of the optical memory device in FIG. 2 except that the projection 13' reflects, instead of transmitting, light.

Figure 6A:
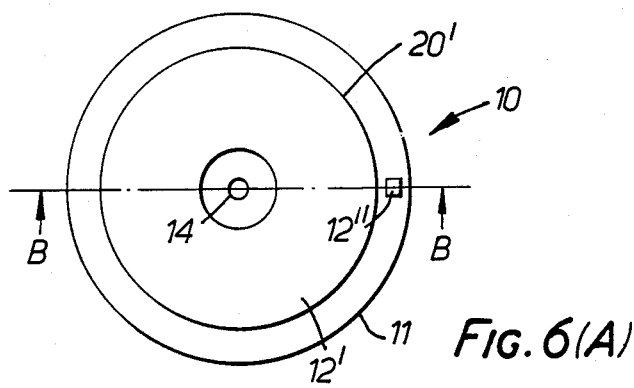
FIG. 6(A) is the schematic plan view showing an optical memory device which is another example of the embodiment of this invention.
Figure 6B:
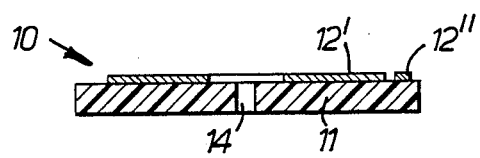
FIG. 6(B) is the sectional view taken along line B—B shown in FIG. 6(A).

FIG. 6(A) is a schematic plan view of another embodiment of this invention, and FIG. 6(B) is a sectional view taken along line B—B of FIG. 6(A). The light-reflecting layer 12 is composed of a circular ring 12' concentric with the center hole 14 of the subplate 11, and a separate part 12" outward of the outer edge of the ring 12". The optical memory device thus formed has the same construction as that of the optical memory device shown in FIG. 2 except that the ring 12' serves as an information recording area and the separate part 12" as a position signal area.

The above explanation of the invention refers to the embodiments shown. However, the invention can include other modifications so far as the essential features of the invention are not changed.

Figure 7A:
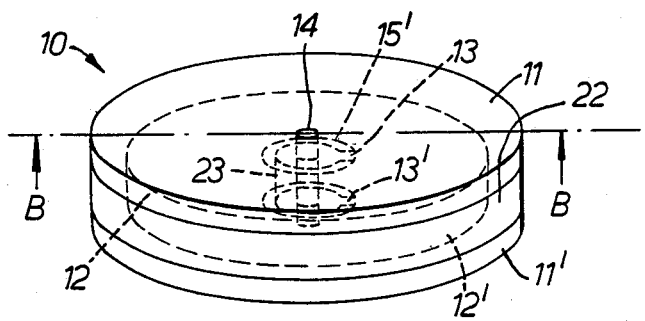
FIG. 7(A) is the schematic perspective view showing an optical memory device which is a modified example of this invention.
Figure 7B:
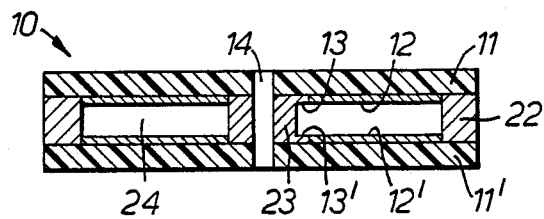
FIG. 7(B) is the schematic sectional view taken along line B—B shown in FIG. 7(A).

As one of the other modifications, an optical memory device as shown in FIG. 7 can be used. FIG. 7(A) is a schematic perspective view, and FIG. 7(B) is a schematic sectional view taken along line B—B of FIG. 7(A) and passing through the center hole. An optical memory device 10' is formed so that two subplates as shown in FIG. 2 are united through supporting members 22 and 23 with the light-reflecting layers 12 and 12', and the projected parts of the position signal areas, facing each other. The optical memory device 10' has twice the memory capacity of the optical memory device 10 shown in FIG. 2.

What is claimed is:
1. An optical memory device comprising:
a rotatable transparent subplate;
a plurality of substantially annular regions located on the surface of said subplate, said annular regions comprising a first region including a layer of a light reflective material adapted to record information and a second region comprised of a substantially uniform material which is different from said light reflective material; and
wherein one of said first and second regions is further defined by a projection which protrudes into the other of said regions to form a discontinuity, said discontinuity being detectable to derive position signal information.

2. An optical memory device as claimed in claim 1, wherein said first region and said projection are comprised of the same material.

3. An optical memory device as claimed in claim 1, wherein said second region and said projection are comprised of the same material.

4. An optical memory device as claimed in claim 1, wherein said second region comprises said subplate.

5. An optical memory device as claimed in claim 4, wherein said substantially uniform material of said second region comprises a transparent synthetic resin.

6. An optical memory device as claimed in claim 1, wherein said second region contacts and is disposed radially inward of said first region.

7. An optical memory device comprising:
a rotatable transparent subplate;
a plurality of substantially annular areas on the surface of said subplate, said annular areas comprising an information recording area having a layer of a light reflective material, and a position signal area having a first region contacting and radially displaced from said information recording area and a second region contacting said first region; and
wherein one of said first and second region comprises a first light reflecting area and the other of said first and second regions comprises a second reflecting area having a reflectivity less than that of said first light reflecting area for providing an indication of the rotational position of the device.

8. An optical memory device as claimed in claim 7 wherein said first light reflecting area is substantially larger than said second reflecting area.

9. An optical memory device as claimed in claim 7, wherein said information recording area and said first light reflecting area are comprised of the same material.

10. An optical memory device as claimed in claim 7, wherein said second reflecting area comprises a discontinuity in said light reflecting material.

11. An optical memory device as claimed in claim 10, wherein said second reflecting area comprises a surface of said subplate.

12. An optical memory device as claimed in claim 7, wherein said position signal area contacts and is disposed radially inward of said information recording area.

13. An optical memory device comprising:
a rotatable transparent subplate;
a plurality of substantially annular regions on the surface of said subplate, said annular regions comprising a first region which is comprised of an information recording area having a layer of a light reflective material, a second region contacting and disposed radially inward of said first region and a third region contacting and disposed radially outward of said first region; and
wherein one of said second and third regions comprises plural reflecting areas, wherein a first reflecting area is substantially larger in area than a second reflecting area and said first reflecting area comprising a layer of material having a reflectivity greater than the reflectivity of said second reflecting area for providing an indication of the rotational position of the device.

14. An optical memory device as claimed in claim 13, wherein said first region and said first reflecting area are formed of the same material.

15. An optical memory device as claimed in claim 13, wherein said second reflecting area comprises said transparent subplate.

* * * * *